(12) United States Patent
Wiio et al.

(10) Patent No.: US 6,944,537 B2
(45) Date of Patent: Sep. 13, 2005

(54) APPARATUS AND METHOD FOR A ROUTE INSTRUCTION SERVICE WITH A THREE-DIMENSIONAL MODEL

(75) Inventors: Antti Wiio, Espoo (FI); Mikko Voipio, Helsinki (FI)

(73) Assignee: Nokia Corporation, Espoo (FI)

( * ) Notice: Subject to any disclaimer, the term of this patent is extended or adjusted under 35 U.S.C. 154(b) by 6 days.

(21) Appl. No.: 10/297,792

(22) PCT Filed: Jun. 8, 2001

(86) PCT No.: PCT/FI01/00546

§ 371 (c)(1),
(2), (4) Date: Jul. 11, 2003

(87) PCT Pub. No.: WO01/95288

PCT Pub. Date: Dec. 13, 2001

(65) Prior Publication Data

US 2004/0015292 A1 Jan. 22, 2004

(30) Foreign Application Priority Data

Jun. 9, 2000 (FI) .......................................... 20001374

(51) Int. Cl.⁷ .............................................. G06F 19/00
(52) U.S. Cl. ....................... 701/209; 701/202; 701/211; 340/990; 340/988
(58) Field of Search ................................ 340/990, 988, 340/995.16, 995.27, 440, 576, 575; 701/209, 202, 211, 201, 208, 210; 345/473; 705/5, 8, 2; 713/200, 168; 342/357.09, 386; 707/10

(56) References Cited

U.S. PATENT DOCUMENTS 5,675,721 A 10/1997 Freedman et al. .......... 395/129

6,058,397 A 5/2000 Barrus et al. ............... 707/104

(Continued)

FOREIGN PATENT DOCUMENTS

| EP | 0579451 B1 | 1/1994 |
| EP | 0762361 A1 | 3/1997 |

(Continued)

OTHER PUBLICATIONS

"View Interpolation for Image Synthesis", Shenchang Eric Chen et al., Apple Computer, Inc., pps. 1–7.
"QuickTime® VR–An Image–Based Approach to Virtual Environment Navigation", Shenchang Eric Chen, Apple Computer, Inc., pps. 1–9.

(Continued)

Primary Examiner—Thomas G. Black
Assistant Examiner—Ronnie Mancho
(74) Attorney, Agent, or Firm—Harrington & Smith, LLP (57) ABSTRACT

The invention relates to a method for implementing a route guidance service in a telecommunications system. In order for it to be possible to utilize both the data transmission capacity of the telecommunications system and the memory and processing capacity of the user workstation efficiently in the execution of a route animation based on a three-dimensional model, the description of the 3D model sent to the terminal is restricted by first defining a route between desired route points and thereafter selecting from the 3D model comprising surface elements at least some of the surface elements that are visible to said route. A partial model comprising only these selected surface elements is transmitted to the user workstation, and in addition the requisite description of how the route animation is constructed on the basis of the partial model.

20 Claims, 4 Drawing Sheets

U.S. PATENT DOCUMENTS

| | | | |
|---|---|---|---|
| 6,285,317 B1 * | 9/2001 | Ong | 342/357.13 |
| 6,321,158 B1 * | 11/2001 | DeLorme et al. | 701/201 |
| 2003/0025615 A1 * | 2/2003 | Kato et al. | 340/990 |
| 2003/0028312 A1 * | 2/2003 | Matsuoka et al. | 701/117 |
| 2003/0197626 A1 * | 10/2003 | Endo et al. | 340/995.1 |
| 2004/0049341 A1 * | 3/2004 | Fujiwara | 701/210 |

FOREIGN PATENT DOCUMENTS

| | | |
|---|---|---|
| EP | 0836168 A1 | 4/1998 |
| EP | 0926652 A1 | 6/1999 |
| EP | 1024467 A2 | 1/2000 |
| WO | WO-01/01370 A1 | 1/2001 |

OTHER PUBLICATIONS

"Multiple–Center–of–Projection Images", Paul Rademacher et al., Univ. of North Carolina at Chapel Hill, 8 pages.

"Virtual Navigation of Complex Scenes using Clusters of Cylindrical Panoramic Images", Graphics Interface '98, pps. 223–232.

"A Panoramic–based Walkthrough System using Real Photos", Yan–Fai Chan et al., 1999 IEEE, pp. 231240.

"Post–Rendering 3D Image Warping: Visibility, Reconstruction, and Performance for Depth–Image Warping", William R. Mark, Graphics and Image Processing Laboratory, Dept., of Computer Science, Univ. of North Carolina, Apr. 21, 1999, pp. 1–204.

* cited by examiner

APPARATUS AND METHOD FOR A ROUTE INSTRUCTION SERVICE WITH A THREE-DIMENSIONAL MODEL

FIELD OF THE INVENTION

The invention relates generally to implementation of a three-dimensional route guidance service through a telecommunications network. More precisely, the invention relates to implementation of a route guidance service by means of a three-dimensional model and to optimization of data transfer across a telecommunications network.

BACKGROUND OF THE INVENTION

Finding one's way to a given location (for example to Helsinki City Hall) is a necessity that everyone encounters sometimes. Merely pointing the direction of the destination is not usually enough. Information is needed on how the destination can be reached from the current location by the available traffic routes.

To solve this problem, for example orientation computers to be installed in a car, which position the car by means of Global Positioning System (GPS) signals and in which the driving instructions are shown on a screen on a map or are given via a loudspeaker as spoken instructions, are available. In these systems, the driving instructions are based on map information stored on a CD-ROM or another form of mass storage. This map information includes a description of the road system in such a way that the route between two points can be retrieved from software. The map also has information on the course of the roads on the basis of which the position indicated by the GPS or other method of positioning can be placed in this road system.

During 1999, the first map service intended for WAP (Wireless Application Protocol) workstations was introduced in Finland. When the map information is on a common server in the network, individual users need not attend to the updating of their map database.

Three-dimensional virtual models have come alongside conventional maps as means of representing areas. Such 3D models are much more illustrative than maps, since in many instances they can serve in orientation and finding the destination better than conventional maps.

Virtual models and maps are not mutually exclusive alternatives, however. The best way to represent a route may be to show its course on a map and simultaneously to show the views along the route in another window, using the 3D model.

Mobile stations are evolving into mobile workstations communicating with data networks. GPS-based solutions, and more recently also solutions utilizing the actual mobile communications network, such as the GSM base station network, have been developed for positioning them.

The latest mobile workstation models in the year 2000 already have displays capable of graphical representation. For example the palm-sized Palm III computer published in February 2000 already has a colour display, whose resolution is sufficient for representing identifiable images of virtual city landscapes.

However, there are still basically two bottlenecks in the mobile use of three-dimensional models: the transmission capacity of the telecommunications network and the storage capacity of the terminal. By the present standards, the quantity of data relating to three-dimensional models is enormous. Transmission of model entities larger than a few blocks at the present data transfer rates of the GSM network, for example, is not practical. Even though the UMTS technology is expected to increase the transfer rate in the actual mobile network many tenfolds, the bottlenecks in the backbone of the Internet will restrict the available transmission capacity. Already with the present fixed ISDN-grade connections the bottleneck is usually constituted by the Internet and not the actual ISDN connection.

The starting point in the prior art is usually the notion that it cannot be known in advance from which direction the 3D objects included in the virtual model are viewed. If for example a virtual city comprises a house around which the user (or more specifically, the camera point representing his eyes) can move freely, the model must include all walls, roof panes and other such parts of the house.

Research and development in the field has centered on the problems of the freely mobile user. There is much prior art by means of which it is attempted to optimize the presentation of a 3D model employed through a data network and the data communication in the network. This work is divided into two main streams:

1. The 'progressive mesh' techniques strive to optimize the down-loading of individual objects through the network in such a way that a coarse model is downloaded first and thereafter more details are retrieved thereinto. Cf. e.g. http://research.microsoft.com/users/hhoppe/.

2. Many solutions seek an optimization of what parts of the model are retrieved through the network on the basis of the distance or visibility of the parts of the model. The aim is to avoid retrieval of information on objects that are not visible on account of the distance, visual obstructions, or for other reasons. U.S. Pat. No. 5,675,721 is an example of the prior art of this trend of development.

However, the drawback of the known technology described above is mainly the fact that the possibilities for optimizing the amount of data to be transmitted to the user through the telecommunications network are restricted. The models must always contain a lot of information, since it is not known in advance which parts of the model can come into the user's view and in what order the nearby parts of the model will come visible to the user.

It is an object of the present invention to eliminate this drawback and to provide a solution to the problem of how the 3D model can be used in route guidance when the amount of data to be transmitted is to be minimized on account of the restrictions of the data transmission capacity available and the memory and processing capacity of the workstation.

SUMMARY OF THE INVENTION

The purpose of the present invention is to provide to the user a service showing him, by means of a three-dimensional virtual model representing the environment, how one moves in the real world from a given starting point to a given target point. Furthermore, the aim is to offer said service in such a way that the quantity of data to be transmitted to the user workstation can be optimized as effectively as possible taking into account both the data transmission capacity of the telecommunications system and the storage and processing capacity of the user workstation.

This objective is achieved through the solutions described in the independent claims.

The idea of the invention is to restrict the description of the 3D model to be transmitted to the user terminal by first defining a route between desired route points and thereafter selecting from the 3D model comprising surface elements at least some of the surface elements that are visible to said route. A partial model comprising only these selected surface elements is transmitted to the user terminal and in addition the requisite description of how the route animation is to be constructed on the basis of the partial model. The terminal constructs the guiding pictures to be shown computationally by means of the partial model given.

Hence, in the method in accordance with the invention a route is first determined, on the basis of which a partial model is constructed from the three-dimensional model used, said partial model comprising only such surface elements as are visible to said route. In addition, presentation data relating to the selected surface elements are defined in the method, by means of which the transmission of the partial model across the telecommunications network to the terminal and/or the execution of the presentation at the terminal can be optimized. Defining of the presentation data generally includes the forming of an ordered set from the surface elements of the partial model, and thus the optimization can be handled by constructing the order in accordance with the desired way of optimization. The definition typically includes at least establishing the order of appearance of the selected surface elements, but it may also include for example definition of the visibility time slot of said surface elements and/or definition of the order of transmission of the selected surface elements using the order of appearance as the decisive criterion for the order of transmission. The order of appearance in this context means the order in which the surface elements become visible in said route, and the visibility time slot means the time slot in which the surface element must necessarily be present in the partial model located in the memory of the terminal in order that the landscape can be correctly constructed. It is advantageous to use the visibility time slot to improve the memory consumption of the terminal, since by means of it surface elements can be removed immediately when they are no longer needed in the route animation.

BRIEF DESCRIPTION OF THE DRAWINGS

In the following, the invention and its advantageous embodiments are described in closer detail referring by way of example to FIGS. 1 to 5, wherein.

DETAILED DESCRIPTION OF THE INVENTION

In virtual technology, polygons are usually used to approximate curved surfaces. The more accurate approximation is desired, the larger number of polygons is needed in the 3D model. Some technologies also permit the use of surfaces represented by mathematical curves. In the following, the term "surface element" is used to denote both such polygons in accordance with the standard technology and other parts of the surface of an object described by a single parameter set and delineated by a closed line, as permitted by the more sophisticated technologies.

Figure 1:
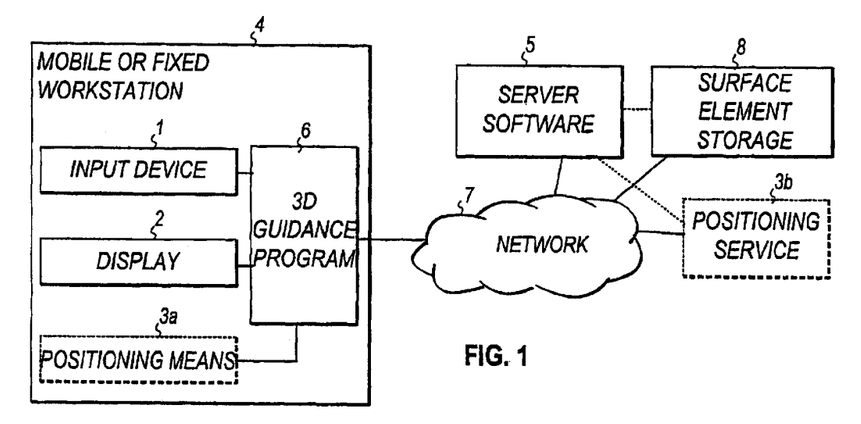
FIG. 1 shows the logical structure of the system in accordance with the invention.

FIG. 1 illustrates the logical structure of the system in accordance with the invention. The user employs a terminal 4, which may be a mobile station or a fixed workstation. The terminal has a 3D guiding program 6, which is connected to server software on server 5 through a data transmission network 7. In practice, the server software is usually located on one server, but in general terms it is an entity comprising one or more program processes and operating in one or more computers (servers), offering the route guidance service in accordance with the invention to the terminals. In implementing the service, the server software utilizes a surface element set stored in a surface element storage 8. The surface elements constitute a 3 D model representing the area to be serviced. The surface element storage may be in connection with the server 5 or on a separate server to which the server 5 has access via the network.

The system can optionally also comprise a possibility for positioning the terminal, in which case the network can also include a separate positioning service 3b, or the terminal can include a separate positioning means 3a. The positioning means 3a may be for example a GPS receiver. If the positioning is performed by a separate positioning system connected to the mobile network, the terminal does not need any separate positioning means.

Through the input device 1 of his terminal, the user gives at least the identifier of the location to which he wishes to be guided (in the area serviced).

This identifier may be for example a telephone number, a street address, or the name of a person or a company. The input device may be for example a keyboard and/or a mouse, by means of which the user gives the identifier he desires, or selects it from the menu shown on the display 2.

The display presents to the user an animation showing by means of a three-dimensional model how one can get to the target from the starting point.

As stated above, the invention is based on the fact that the entire model of the area for which guidance is given is not sent to the workstation, but the route is determined first and on the basis thereof a specific part of the model is sought. In determining the route for which guidance service is given, the process goes through the route and compiles a list of the surface elements that are visible to this route. Thereafter the server 5 sends to the user only those surface elements that are visible to the route. Furthermore, the servers sends a description of the course of the route for which guidance is given in a three-dimensional space (model). The starting point of the route for which guidance is given can be determined in two ways:

1. The system positions the terminal and determines an appropriate route to the target.

2. The user himself tells the system what location should be used as the starting point. He might for instance request a route from the Market Square to the House of Estates, even though he himself is currently not at the Market Square.

Figure 2:
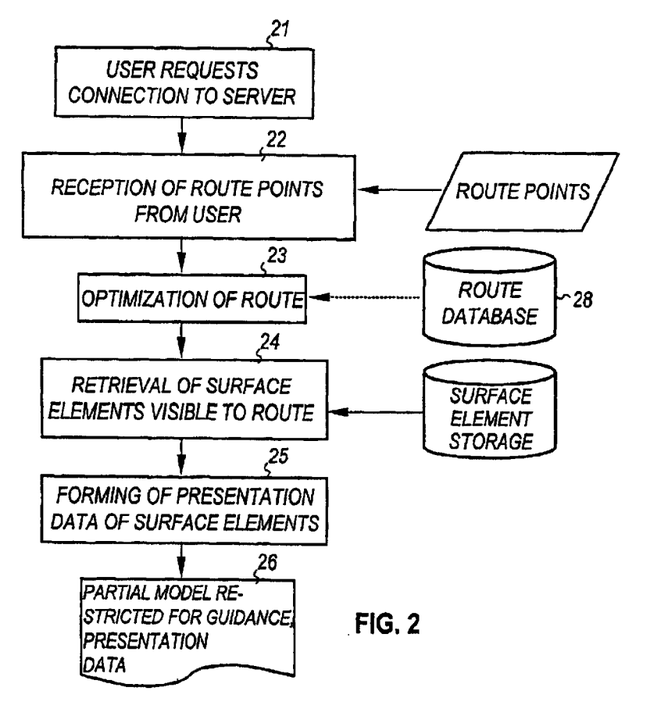
FIG. 2 is a flow chart illustrating the method in accordance with the invention.

FIG. 2 is a flow chart describing the method in accordance with the invention from the point of view of the server. To start with, the user requests from his terminal a connection to a server offering the guiding service, e.g. server 5 (step 21). As a result, a service session is established between the terminal and the server in the known manner, and the server receives the route points from the user (step 22). There are typically two route points, that is, the starting and end point of the route, and they can be given for example as street addresses corresponding to said points. On the basis of the route points received, the server software determines the route from the starting point to the end point (step 23). The determining takes place in a known manner for example on the basis of the existing graph theory. The route determined is typically presented as a polyline consisting of a chain of successive examination points. The chain may naturally also include other points, for example points at which the user can freely look in different directions. The distance between the points of examination is in practice dependent on the environment and can vary for example from one meter to a few dozen meters.

It is also possible that the routes in the area to be serviced have been calculated in advance, and thus they are retrieved from a route database, denoted with reference numeral 28, at this point.

When the route is known and there is a three-dimensional description of its surroundings, i can be computationally determined what parts of the model are visible to the route. This is done in the next step (step 24), in which the surface elements that are visible to the route just determined are picked from the surface element storage 8. The picking can take place across the network if the surface element storage is not located in connection with the server.

When the route is known and there is a three-dimensional description of its surroundings, it can also be computationally determined in what order and at which point of time each part (surface element) in the model becomes visible. Such timing of the presentation of the parts of the model is carried out in step 25, whereafter a partial model restricted for the guiding service with the necessary presentation data has been produced. Said data (providing a description of how the route animation is constructed at the terminal) is stored for transmission to the terminal (step 26). Generally speaking, in step 25 forming of presentation data relating to the selected surface elements is carried out, since said data can vary on the basis of how the presentation is executed and how effectively data transfer and memory consumption are optimized. For example, information on the visibility time slot of each surface element may be included, even though this is usually not indispensable.

Hence, it is characteristic of the guiding in accordance with the invention that the route is first determined on the basis of the desired starting and target points and thereafter on the basis of the route a three-dimensional animation is constructed from the parts of the 3D model that are visible to said route. Thus the amount of data to be transmitted can be substantially reduced.

Figure 3:
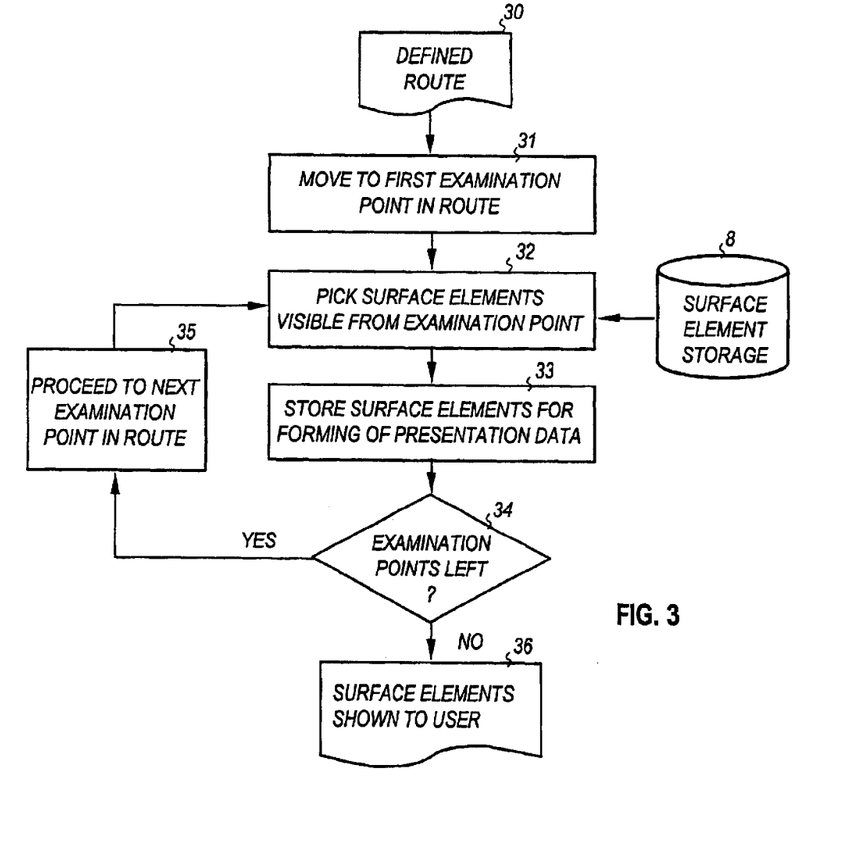
FIG. 3 is a flow chart illustrating an example of the retrieval of surface elements.

FIG. 3 shows a closer example of a surface element retrieval to be performed in step 24. As stated previously, at this stage the route which the user will travel or which he is otherwise interested in is known. Firstly, the picking process moves to the first examination point of the route and picks from the surface element storage the surface elements that are visible to this point (steps 31 and 32). The picked surface elements are stored for forming presentation data (step 33). Thereafter it is studied whether there are still examination points remaining in the route (step 34). If this is the case, the next examination point is proceeded to (step 35) and the above steps are carried out for said point. When all examination points have been gone through, all surface elements visible to said route are stored on the server (step 36). The picking can produce, in addition to a set of surface elements, for example a list showing the index of each surface element at each examination point.

The picking of surface elements visible to a given examination point takes place using prior art methods of computer graphics. The surface elements can be found for example in such a way that the route is progressed in short steps and of each image rendered, it is studied which of the polygons in the database are located in the viewers frustrum, that is, in the space seen by a virtual viewer. From the frustrum, the polygons that the viewer actually sees, i.e. those not affected by visual obstructions or the like, can be sought further. This can be done for example by using the known ray pick functions.

All surface elements visible to the user from one examination point can be included, or filtering may be employed for example in such a manner that after a given distance, the surface elements are no longer taken into account. This is important for example at examination points at which the landscape is very open and at which there is a lot of visibility.

Figure 4:
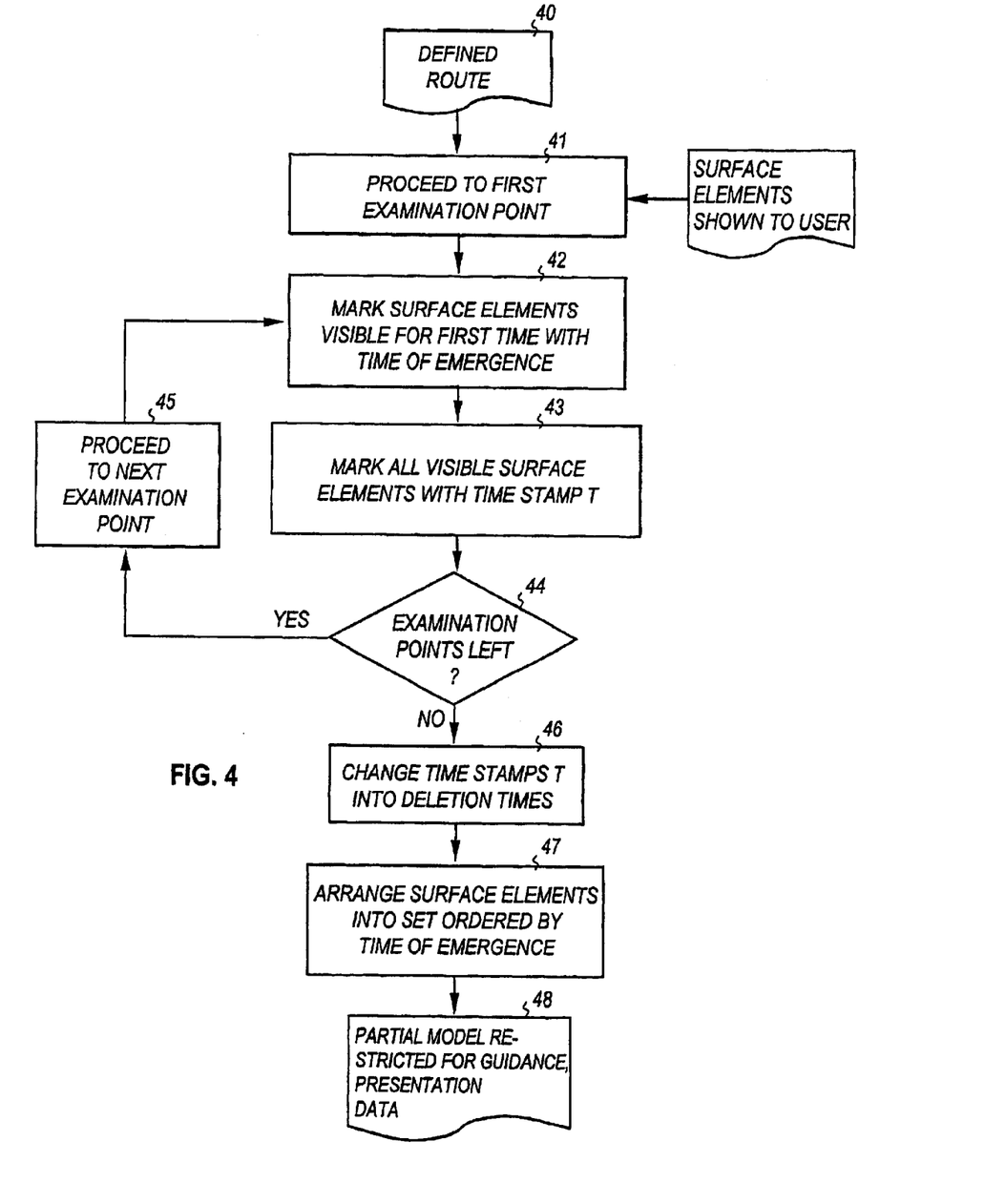
FIG. 4 is a flow chart illustrating an example of forming the presentation data of surface elements.

FIG. 4 shows a closer example of the forming of presentation data of surface elements as performed in step 2 in FIG. 25. The process first proceeds to the first examination point in the route, in which the current time is marked as the moment representing the time of emergence on all surface elements that come visible to the user for the first time at the first examination point (step 42). In practice, a time stamp representing the current time is marked as the time of emergence on all surface elements visible to the first examination point, since these points usually do not already have any time stamp. Thus, the time of emergence is the moment at which the surface element must be introduced into the data structure of the partial model in order for the landscape to be correct. When the time of emergence has been marked on all surface elements becoming visible for the first time at the first examination point, a time stamp T, representing the current time, is further marked (step 43) on all surface elements visible from said point. Thereafter it is studied whether examination points still remain in the route (step 44). If this is the case, the next examination point is proceeded to (step 45) and steps 42 and 43 are performed for said point. Hence, at each examination point a time of emergence proportional to the current time is marked on the surface elements when said examination point is the one at which the surface element comes visible for the first time in the route. Furthermore, time stamps T are marked on all surface elements visible from the examination point. When there are no examination points left, the time stamps T on the surface elements are converted into deletion times (step 46) and the surface elements are arranged into a set ordered by time of emergence (step 47). Thus the route has been gone through in its entirety, and by means of the time of emergence the moment at which the surface element becomes visible for the first time in the route has been defined for each surface element, and by means of time stamp T the moment after which the surface element is no longer visible in the route (the time stamp T is not updated after the surface element is visible for the last time). Hence, the memory consumption of the terminal can be optimized, as the time stamp T indicates the moment when the surface element can be removed from the partial model located in the memory of the terminal. If the speed of passing the route has a certain ratio to the travelling speed of the user or the speed of progressing of the animation, the actual time of visibility of each surface element in the route is known. Omitting steps 43 and 46, the mere order of appearance indicated by the times of emergence is found.

The result from the process in accordance with FIG. 4 is a partial model visible to the user, with presentation data. This ordered set of surface elements is stored in step 48. The data structure to be stored can be implemented in a variety of ways. Usually, however, data structures in graphics are tree structures in which a given subtree represents an entity consisting of a number of surface elements and the lowest nodes (leaves) in the tree are individual surface elements. In this exemplary case, the above emergence and deletion times are marked in a node representing one or more surface elements, such as a building or a wall. One of said times indicates the time at which the corresponding surface element or entity becomes visible for the first time, at which time it must be present in the memory of the terminal, and the second indicates the time at which the corresponding surface element or entity vanishes from view for the last time, at which time it can be deleted from the memory of the terminal.

Figure 5:
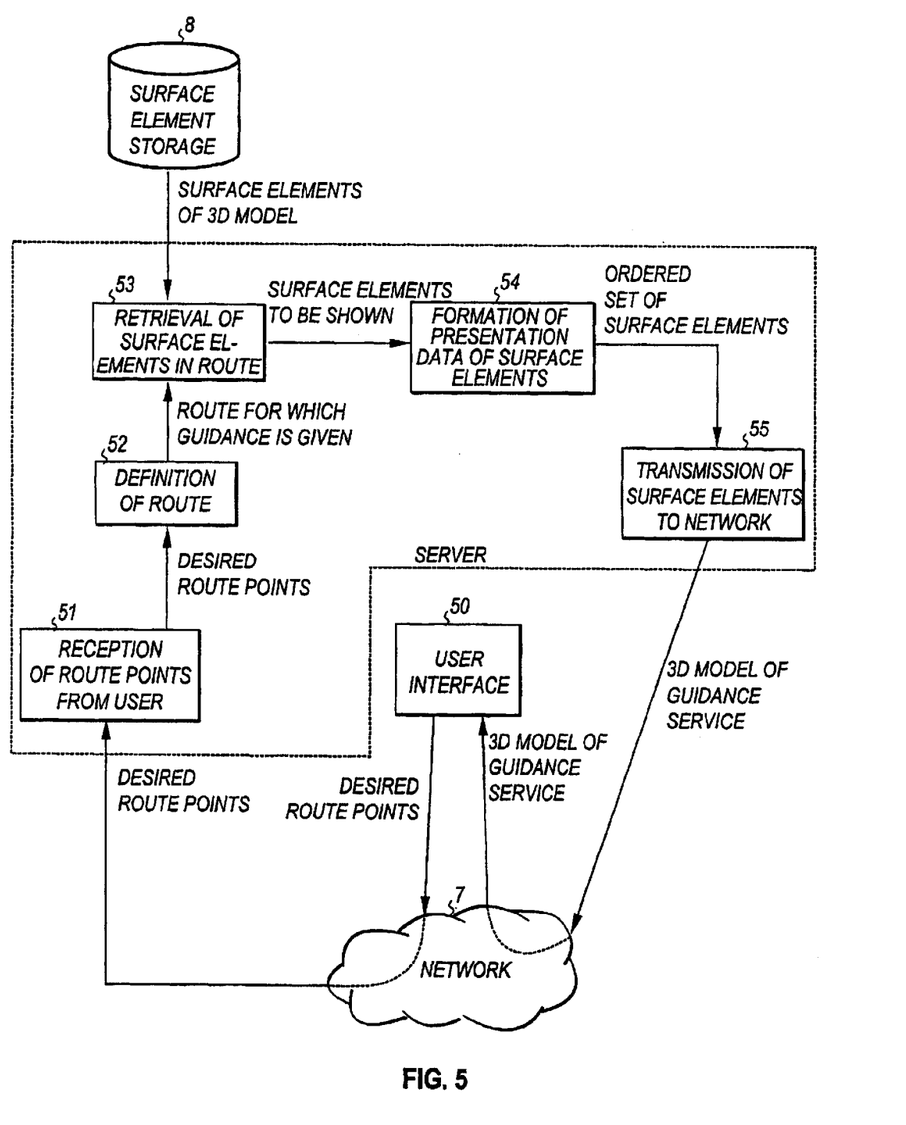
FIG. 5 shows data streams and functional blocks in the system in accordance with the invention.

FIG. 5 illustrates the data streams in the system in accordance with the invention and the functional blocks handling them. In the figure, the user terminal is illustrated by means of a user interface 50, through which the desired route points are given to the server on the one hand and the restricted model used for guiding is received from the server on the other hand. The reception process 51 for route points located on the server receives the desired route points and forwards them to a route definition process 52 in which the route optimization in accordance with step 23 in FIG. 2 is carried out or an already calculated route is retrieved from the database. When the route for which guidance is given is mapped out, the data relating thereto is forwarded to a surface element retrieval process 53, carrying out step 24 in FIG. 2 for example in the manner shown in FIG. 3. The set of surface elements to be displayed in accordance with step 36 is forwarded from the retrieval process to the formation process for presentation data 54. Said formation of presentation data can be implemented for example as shown above in connection with FIG. 4. As stated previously, the formation of presentation data includes at least determining the order of appearance of the surface elements, but it may also include definition of their visibility time slot for example in accordance with FIG. 4.

On the other hand, the formation of presentation data can also include timing or optimization of transmission. For example, buildings can be classified into different categories in terms of perception (important buildings or objects, such as monuments, on the one hand and insignificant gray houses on the other hand). In that case, it may be significant to transmit important buildings or objects first, even though they are not displayed immediately. This is because if one proceeds along the route so fast that there is not enough time to transmit even a restricted 3D model across the network, the pruned model will show at least the landmarks important for the route, which aid in visual orientation. Step 25 in FIG. 2 can thus comprise, besides the definition of the relative order of appearance of the surface elements, also the definition of their order of transmission. Hence, the order of transmission can be the same as the order of appearance, but can also deviate from that order. Generally speaking, it is of no relevance for the terminal in which order the surface elements are transmitted, as long as it receives information on their order of appearance or is capable of constructing this information on the basis of the information it has received. As was stated above, however, the order of transmission may have significance in view of the data transmission capacity available, and therefore the order of appearance can be used as one criterion in determining the order of transmission, and also other criteria may be employed. The surface element transmission process thus receives for transmission an ordered set of surface elements, and thus the transmission of the partial model across the network can be optimized by means of said order. In addition to the presentation data described above, other information relating to the execution of the animation can naturally also be forwarded to the terminal.

The transmission can also be scheduled by observing the moments at which the surface elements become visible in the route. Thus the surface elements that come visible first can be transmitted first and the other elements according as how they become visible. If the visibility time is used, the sending of the information can be scheduled in accordance with the deletion times by loading new data into the memory of the terminal as surface elements are removed from memory.

The 3D guiding program located at the workstation receives the partial model visible to the user and constructs, in known manner, therefrom an animation that proceeds from the starting point to the target point. In addition to the surface elements, arrows representing the direction of travel, names of buildings/landmarks or instructions that may be in textual or audio form can be added to the presentation. The latest terminals have the capability of presenting the user with stereo sound as well. If the user is oriented in accordance with the image, he can possibly also be guided by the stereo sound to turn in the right direction. On the basis of e.g. restrictions in its computing capacity, the workstation may even make decisions of its own for forming the presentation in a manner deviating from the order of transmission or the defined order of appearance.

If the system incorporates a positioning function, the guiding program on the terminal can synchronize the progressing of a perceived location with the proceeding of the animation. The synchronization may also be performed at the server, especially if the location information is- received by the server and not the terminal. In such a case, the user would continuously see the same view in real world and on the display of the terminal. The program could also alert the user if it finds that he has strayed from the route.

Even though the invention has been described in the above with reference to examples in accordance with the accompanying drawings, it is evident that the invention is not restricted thereto but can be modified within the scope of the inventive idea disclosed in the appended claims. For example, the quantity of real-time computation can be regulated by performing at least part of the computation in advance. In the above, an embodiment has been disclosed in which both optimizing the route and determining the partial model and the data relating thereto are performed in real time. It is possible, however, to define part of the data called for in advance and to store them for later use. As stated previously, for example the routes can be determined in advance. On the other hand, route calculation in real time can be carried out in such a way that only the routes most frequently requested are stored in memory. Also partial models based on routes and presentation data relating thereto can be stored, so that at least not all enquiries require real-time computation. It is also possible that a part of the 3D model is already stored at the user terminal, and thus the surface elements pertaining to that part need not be forwarded across the network, but it suffices to forward their identifiers. Also, the route need not necessarily be determined in the manner described above, but it can be defined in several parts, in which case the user may also have an opportunity to influence where the route passes. The system can also operate in such a way that the server does not pick the surface elements, but requests the surface element storage to send the surface elements it selects to the terminal.

What is claimed is:

1. A route guidance service method operable in a telecommunications network, where an area serviced by the route guidance service method is represented by a three-dimensional model comprising surface elements corresponding to features visible in the area, the route guidance service method comprising:

first, creating a description of a route animation by:

defining a route between selected route points, wherein the route and route points lie within the area serviced by the method;

selecting surface elements corresponding to features visible at locations along the route from the three-dimensional model on the basis of the route defined;

forming an ordered set from the selected surface elements by (1) determining an order of appearance of the selected surface elements as the route is traversed, the order of appearance indicating the order in which features corresponding to the surface elements become visible as the route is traversed, and (2) using the order of appearance as a criterion for forming the ordered set, where the description comprises at least in part the ordered set; and then transmitting the description of the route animation over the telecommunications network to a terminal having a display;

recreating the route animation from the description at the terminal; and displaying the route animation on the display of the terminal.

2. A method as claimed in claim 1, where when defining the order of appearance, times of emergence are determined for the surface elements as the route is traversed, the time of emergence of a surface element representing the moment at which a feature corresponding to the surface element becomes visible for the first time as the route is traversed.

3. A method as claimed in claim 2, where in addition to the order of appearance, a visibility time is defined for the selected surface elements, which when added to the time of emergence determines a deletion time representing the moment after which a feature corresponding to the surface element is no longer visible as the route is traversed.

4. A method as claimed in claim 3, where the surface elements belonging to the set as well as their order of appearance and visibility times are transmitted in said description.

5. A method as claimed in claim 4, where the transmission is scheduled in accordance with visibility times.

6. A method as claimed in claim 1, where the surface elements belonging to the set are transmitted in the description, and where the transmission takes place in the order determined by the ordered set.

7. A method as claimed in claim 6, where the transmission is optimized by forming the ordered set in an order deviating from the order of appearance.

8. A method as claimed in claim 7, where the selected surface elements are sent in the order of importance in view of perceiving the important features visible along the route as the route is traversed.

9. A method as claimed in claim 1, where the current position of the terminal having a display is also monitored in the method and the route is presented synchronously with the position of the terminal.

10. A method as claimed in claim 1, where only such surface elements that are within a given distance from the route are selected from the three-dimensional model.

11. A method as claimed in claim 1, where the route is defined between the desired starting point and end point.

12. A route guidance service system for providing a route guidance service to a user over a telecommunications network, the route guidance service system comprising:

a three-dimensional model of an area serviced by the route guidance service system, the three-dimensional model comprised of surface elements representing features visible in the area, a description means for creating a description of a route animation, the description means further comprising:

a route determining means for constructing a route between desired route points, selection means responsive to the route determining means and adapted to select from the three-dimensional model surface elements corresponding to features that become visible as the route is traversed, and a set creation means for creating an ordered set from the selected surface elements on the basis of the route, the set creation means adapted to define for the selected surface elements an order of appearance corresponding to the order of appearance of the surface elements as the route is traversed; and transmission means for transmitting the description to the user over the telecommunications network.

13. A route guidance service system as claimed in claim 12, further comprising positioning means for positioning the user terminal, and where the presentation means are adapted to synchronize the presentation with the position data given by the positioning means.

14. A route guidance service system as claimed in claim 12, where the transmission means are adapted to transmit the selected surface elements in the order determined by the ordered set to the user.

15. A route guidance service system as claimed in claim 14, further comprising means (54) for defining a visibility time for the selected surface elements, the visibility time indicating the moment at which a surface element becomes visible for the first time as the route is traversed and the moment after which the surface element will no longer be visible as the route is traversed.

16. A route guidance service system as claimed in claim 15, where the transmission means are adapted to time the transmission in accordance with the visibility time.

17. A route guidance service system as claimed in claim 14, where the set creation means are adapted to form from the selected surface elements an ordered set in accordance with the order of appearance of the surface elements.

18. A route guidance service system as claimed in claim 14, where to optimize the transmission of the surface elements, the set creation means are adapted to form an ordered set deviating from the order of appearance of the surface elements.

19. A computer readable memory medium for storing computer program instructions which, when executed, perform operations for providing a route guidance service over a telecommunications network, the route guidance service servicing an area, wherein the area is represented by a three-dimensional model comprising surface elements corresponding to features visible in the area, the operations comprising:

creating a description of a route animation by:

defining a route between selected route points, wherein the route and route points lie within the area;

selecting surface elements corresponding to features visible at locations along the route from the three-dimensional model; visible at locations along the route from the three-dimensional model;

forming an ordered set from the selected surface elements by (1) determining an order of appearance of the selected surface elements as the route is traversed, the order of appearance indicating the order in which features corresponding to the surface elements become visible as the route is traversed, and (2) using the order of appearance as a criterion for forming the ordered set, where the description comprises at least in part the ordered set; and then transmitting the description of the route animation over the telecommunications network to a terminal having a display.

20. The computer readable memory medium of claim 19, where the operations further comprise:

recreating the route animation from the description at the terminal; and displaying the route animation on the display of the terminal.

* * * * *

UNITED STATES PATENT AND TRADEMARK OFFICE
CERTIFICATE OF CORRECTION

PATENT NO. : 6,944,537 B2
DATED : September 13, 2005
INVENTOR(S) : Wiio et al.

It is certified that error appears in the above-identified patent and that said Letters Patent is hereby corrected as shown below:

<u>Column 11,</u>
Line 1, the first "visible at locations along the route from the three-dimensional model;" should be deleted.

Signed and Sealed this

Thirteenth Day of December, 2005

JON W. DUDAS
*Director of the United States Patent and Trademark Office*